March 10, 1931. H. R. BRAND 1,795,828
DELIVERY MECHANISM FOR FOOD PREPARING MACHINES
Filed June 27, 1929
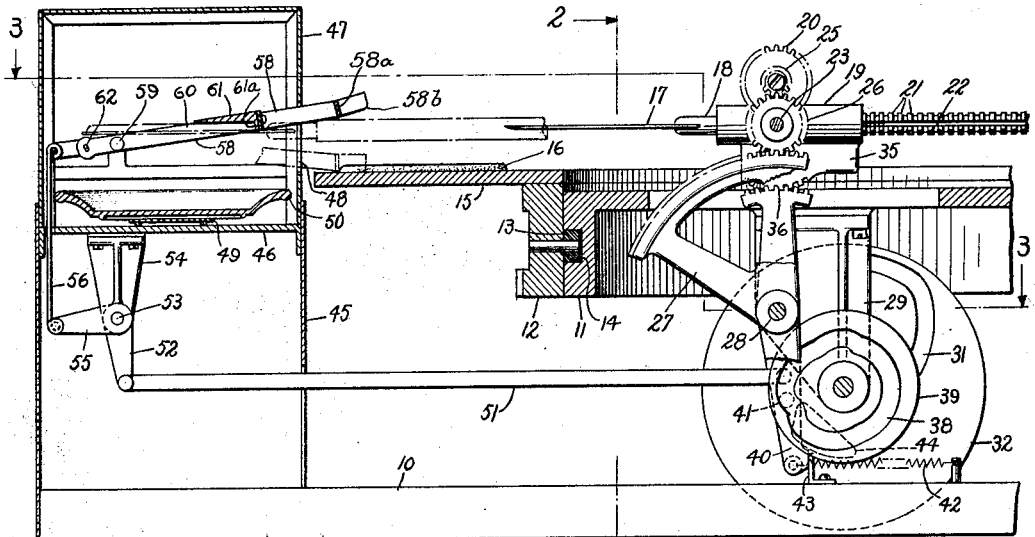
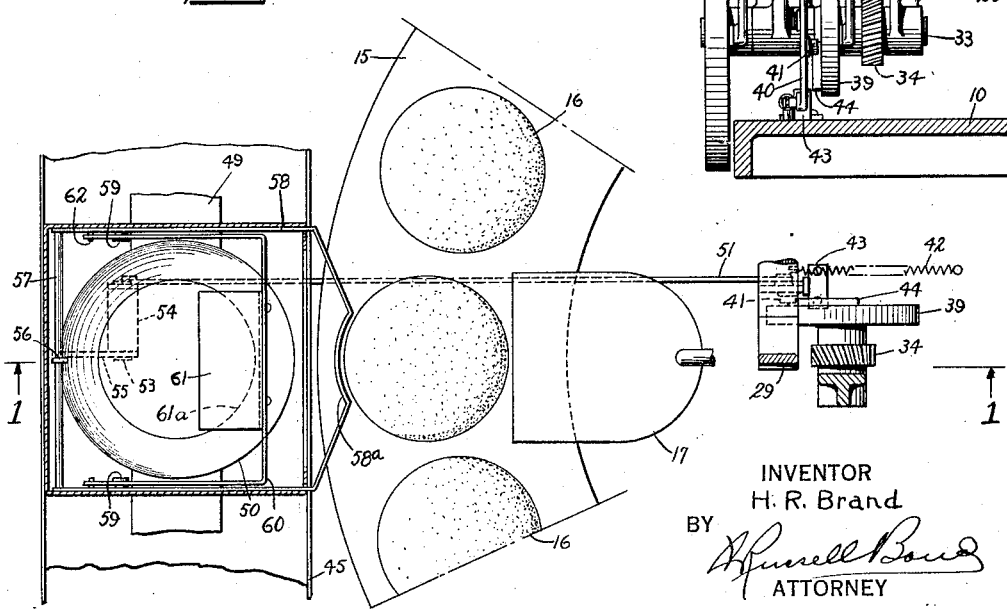
INVENTOR
H. R. Brand
BY
ATTORNEY Patented Mar. 10, 1931

1,795,828

UNITED STATES PATENT OFFICE

HARRY RUSSELL BRAND, OF NEW YORK, N. Y.

DELIVERY MECHANISM FOR FOOD-PREPARING MACHINES

Application filed June 27, 1929. Serial No. 373,971.

My invention relates to food preparing machines, and more especially to means for delivering the food from the machine after it has been prepared.

My invention is particularly adapted for use in machines for baking griddle cakes and the like, and has for a specific object to provide means for peeling a cake off a griddle and depositing it upon a suitable receptacle.

The present invention is a variant of that shown in my copending application, Serial No. 268,659, filed April 9, 1928. In said application I show means for peeling a cake off a griddle and then inverting the cake and depositing it upon a plate, the cake being inverted because the side last baked is usually smoother and more evenly browned than the side first baked. However, under certain conditions, I find that the side first baked has the better appearance and hence under such conditions it is desirable to deliver the cake without inverting it. Furthermore, my invention is applicable not only to a griddle cake baking machine, but also to machines for baking, frying or otherwise preparing other foods, and in many cases it is desirable to cook the foods on one side only; such foods must be deposited on the plate without being inverted.

It is therefore an object of the present invention to provide means for removing food from a cooking surface and depositing the food on a plate or other suitable receptacle without inverting the food.

The present invention is also related to that disclosed in my copending application Serial No. 373,970, filed June 27, 1929. In said application I show means for holding food against sliding along a cooking surface while a peel is introduced thereunder to pick the food off said surface.

It is a specific object of the present invention to provide similar means for keeping the food from sliding in one direction while it is being picked up, together with means for keeping the food from sliding in the opposite direction after the peel has been moved over a plate or other receptacle and while the peel is being withdrawn from the food, so that the food will drop without inversion upon said plate.

Other objects will appear in the following description of a preferred embodiment of my invention and thereafter the novelty and scope of my invention will be pointed out in the claims.

In the accompanying drawings;

Figure 1 is a view in section of a portion of a griddle cake baking machine, the section being taken substantially on the line 1—1 of Fig. 3;

Fig. 2 is a view in transverse section taken substantially on the line 2—2 of Fig. 1; and Fig. 3 is a view in section taken on an irregular line 3—3 of Fig. 1.

In the accompanying drawings, I have shown two frame members of a griddle cake baking machine, one of the members 10 constituting the base of the machine, while the other member 11 is circular and provides an annular bearing for a gear ring 12. The gear ring is supported on the bearing member 11 by means of rollers 13 carried by the gear ring and adapted to travel in a slot 14 formed in the periphery of the member 11. Secured to the gear ring is an annular griddle 15 on which portions of batter may be deposited, the batter portions being baked into cakes 16 by means of heating elements (not shown) under the griddle. The griddle is advanced step-by-step by an intermittent driving gear (not shown) engaging the gear ring 12, and at each step the griddle advances through an angle measured by the normal center-to-center spacing of the cakes 16. As each cake reaches a predetermined point in its orbit, it is picked up by a peel and redeposited upon the griddle in inverted position to be baked on the opposite side, and at another point in its orbit the cake is picked up by a second peel, carried thereby clear of the griddle and is then dropped upon a plate without being turned over. The present invention has to do only with the latter peel, the former peel not being shown in the drawings and not being again referred to.

Said second peel consists of a blade 17 provided with a stem 18 fitted to slide in a bearing member 19. Mounted on the bearing member 19 and projecting through a slot therein, is a pinion 20 which is adapted to engage teeth 21 formed on the stem 18, so that by rotating the pinion 20, the stem may be reciprocated axially. The stem may be prevented from rotating by a key (not shown) in the bearing member 19 which engages a spline groove 22 in the stem. The member 19 is provided with trunnion shafts 23 which are journaled in brackets 24 secured to the frame member 11. The pinion 20 is operatively connected by a second pinion 25 to a gear 26 journaled on one of the trunnion shafts 23. The gear 26 is engaged by a toothed sector 27 which is fixed to a shaft 28 supported in bearings 29 depending from the under side of the frame member 11. Secured to one end of the shaft 28 is a depending arm 30; the latter bears a roller which engages a groove 31 in a face cam 32. The cam is mounted and fixed upon a shaft 33 which is suitably journaled in the brackets 29. Fixed upon the shaft 33 is a gear 34 adapted to be engaged by suitable driving mechanism (not shown) to rotate the shaft 33 and with it the cam 32. The rotation of the shaft 33 takes place in timed relation to the feed of the griddle, the relation being such that the shaft 33 makes one complete rotation at each forward step and pause of the griddle 15.

The bearing member 19 is provided with a depending flange 35. An arcuate portion of the flange is toothed to mesh with a toothed sector 36. The sector 36 is journaled to turn freely on the shaft 28 and is provided with a depending arm 37 which engages a groove 38 in a face cam 39. The latter is also fixed upon the shaft 33.

In operation the peel is tilted by the cam 39 acting through the sector 36 and toothed flange 35 to rock the bearing member 19 on its trunnions. The peel is first tilted so that the forward edge of the blade 17 engages the griddle. Then cam 32 acts through sector 27 and gear 20 to advance the blade and peel off the cake, if any, that lies in its path. After the cake has been picked up on the blade, the latter continues to advance until the cake has been carried clear of the griddle and then is brought to horizontal position under control of the cam 39, as shown by broken lines in Fig. 1.

Journaled to turn freely on the shaft 28 is a depending arm 40 which bears a roller 41. The latter lies close against a face of the cam 39. A spring 42 serves to draw the arm against a stop 43. Mounted on the cam 39 in position to engage the roller 41, is a pad 44. This pad on striking the roller 41 will swing the arm 40 outward against the pull of the spring 42.

Secured to the base 10 and tangent to the griddle 15 is a casing 45, the upper wall 46 of which serves as a shelf on which a conveyor belt 49 is supported. The conveyor belt is adapted to support and convey plates 50 along the shelf 46. Fitted over the casing at the point where cakes are delivered to the plates is a hood 47 provided with an opening 48 in one wall thereof to admit the peel.

A connecting rod 51 is pivotally connected at one end to the arm 40, and at the other end to a depending arm 52 secured to a shaft 53. The latter is journaled in a bearing 54 depending from the shelf 46. Secured to the shaft 53 and projecting outwardly at right angles to the arm 52, is a second arm 55 which is connected by a rod 56 to a cross bar 57. The latter connects the free ends of a U-shaped frame or yoke 58 mounted to oscillate on studs 59 fitted in opposite end walls of the hood 47. This yoke 58 projects through the opening 48 and is formed with an arcuate portion 58a adapted to bear against the edge of a cake to prevent the latter from sliding while the peel is introduced thereunder.

The studs 59 also serve as fulcrums for an inner U-shaped frame or yoke 60. The yoke 60 has a limited oscillatory movement with respect to the yoke 58 having pin and slot connection therewith as indicated at 62. The yoke 60 does not project through the opening 48 but bears a transverse scraper member 61 in such position as to engage the rear edge of a cake after it has been advanced into the hood 47, and scrape the cake off the peel as the latter returns to the full line position shown in Fig. 1. The scraper is in the form of a blade with shoulder 61a on the underside thereof to provide a scraping edge. The operation of the yoke is as follows: The spring holds the yoke 58 normally in the position shown by full lines in Fig. 1. When the cam 40 tilts the peel into contact with the griddle 15 the pad 44 strikes the roller 41 and depresses the yoke 58 to the position shown in broken lines, and the abutment 58a by bearing against a cake prevents the latter from sliding while the blade 17 is being introduced thereunder. The blade advances until it passes under the abutment, the latter being slightly beveled at each end, as indicated at 58b, so that it will ride up on the blade. As soon as the blade has picked up the cake the roller 41 will drop off the pad 44 and the yoke 58 will spring up to the position shown by full lines under the urge of the spring 42. The blade will continue to advance under control of cam 32, in the mean time being partly raised toward horizontal position by the cam 39. When the cake has been carried into the hood 47, so that it is centered over a plate 50 therein, the blade is raised to the horizontal position shown by broken lines in Fig. 1. The inner yoke will then be tilted upward by engagement of the scraping edge 61a of the member 61 with the blade 17. Said scraping edge engages the blade to the rear of the cake. The cam 32 now operates to withdraw the blade 17 which slides out from under the cake because the latter is held from moving with the blade by the scraper. As the peel is withdrawn the cake drops upon the plate 50.

It will be understood that the advance of the peel takes place during a pause in the step-by-step rotation of the griddle, but withdrawal of the peel to the position shown in Fig. 1, may take place while the griddle is in motion.

While I have described a specific embodiment of my invention, I wish it to be understood that I consider myself at liberty to make such changes in construction and in form and arrangement of parts as fall within the spirit and scope of the following claims.

I claim:

1. In a cooking machine, a member providing a surface on which food may be cooked, a device for picking up food from said surface and moving the food clear of said surface, and means for positively removing the food from said device.

2. In a cooking machine, a member providing a surface on which food may be cooked, a device for picking up food from said surface, and moving the food clear of said surface, and means for removing the food from said device while the food remains in its normal upright position.

3. In a cooking machine, a member providing a surface on which food may be cooked, a device for picking up food from said surface and moving the food clear of said surface, and means for scraping the food off said device.

4. In a cooking machine, a member providing a cooking surface for food, a receptacle adjacent said surface, a device for picking up food from said surface and carrying the food over said receptacle, and means for scraping the food off said device and dropping the food upon said receptacle.

5. In a cooking machine, a member providing a cooking surface for food, a peel, means for advancing the peel to peel off food from said surface and carry the same to a predetermined point, means for withdrawing the peel, and means adapted to engage the peel back of the food to scrape the food off the peel as the latter is withdrawn.

6. In a cooking machine, a member providing a cooking surface for food, a peel, a receptacle adjacent said surface, means for advancing the peel to pick up the food and convey the same to a point above the receptacle, means for withdrawing the peel, and means adapted to scrape the food off the peel as the latter is withdrawn.

7. In a cooking machine, a member providing a cooking surface for food, a peel, a scraper, means for advancing the peel to pick up the food and carry it under and past the scraper, means for raising the peel against the scraper, and means for withdrawing the scraper in contact with the peel.

8. In a cooking machine, a member providing a cooking surface for food, a peel, a scraper, means for advancing the peel to pick up the food and carry it under and past the scraper, means for raising the peel against the scraper, means for withdrawing the scraper in contact with the peel, and a receptacle adapted to receive the food scraped off the peel.

9. In a cooking machine, a member providing a cooking surface for food, a peel, means for advancing the peel to peel off food from said surface and carry the food to a predetermined point, means for retaining the food against sliding along the surface while the peel is being introduced thereunder, and means for scraping the food off the peel after it has been carried to said point.

10. In a cooking machine, a member providing a cooking surface for food, a peel, means for advancing the peel in contact with the surface to peel food off said surface and carry the food to a predetermined point, an abutment against which the food bears while the peel is being introduced thereunder, and means for removing the abutment from the path of the food when the latter has been picked up by the peel.

11. In a cooking machine, a member providing a cooking surface for food, a peel, means for advancing the peel in contact with the surface to peel food off said surface and carry the food to a predetermined point, an abutment against which the food bears while the peel is being introduced thereunder, and means for raising the abutment clear of the food after the food has been picked up by the peel.

12. In a cooking machine, a member providing a cooking surface for food, a peel, means for advancing the peel in contact with the surface to peel food off said surface and carry the food to a predetermined point, an abutment against which the food bears while the peel is being introduced thereunder, means for raising the abutment clear of the food after the food has been picked up by the peel, a scraper carried by the abutment, means for raising the peel against the scraper, and means for withdrawing the peel in contact with the scraper to scrape the food off the peel.

13. In a cooking machine, a member providing a cooking surface for food, a peel, means for advancing the peel in contact with the surface to peel food off said surface and carry the food to a predetermined point, an abutment against which the food bears while the peel is being introduced thereunder, means for raising the abutment clear of the food after the food has been picked up by the peel, a scraper carried by the abutment and having slight vertical play relative thereto, means for raising the peel against the scraper, and means for withdrawing the peel in contact with the scraper to scrape the food off the peel.

14. In a cake baking machine, a rotary griddle, means for advancing the griddle step-by-step to bring cakes thereon successively to a delivery point, a peel at said point, means operating during each pause in the motion of the griddle to swing the peel into contact with the griddle and to advance the peel to pick up a cake and carry the same clear of the griddle, an abutment movable into engagement with the griddle to prevent the cake from sliding as it is being picked up by the peel, means for raising the abutment from the path of the cake after the latter has been picked up, a scraper, means for raising the peel against the scraper, and means for withdrawing the peel in contact with the scraper to scrape the cake off the peel.

15. In a cake baking machine, a rotary griddle, means for advancing the griddle step-by-step to bring cakes thereon successively to a delivery point, a peel at said point, means operating during each pause in the motion of the griddle to swing the peel into contact with the griddle and to advance the peel to pick up a cake and carry the same clear of the griddle, an abutment movable into engagement with the griddle to prevent the cake from sliding as it is being picked up by the peel, means for raising the abutment from the path of the cake after the latter has been picked up, a scraper, means for raising the peel against the scraper, and means for withdrawing the peel in contact with the scraper during advance of the griddle to scrape the cake off the peel.

16. In a cake baking machine, a rotary griddle, means for advancing the griddle step-by-step to bring cakes thereon successively to a delivery point, a peel at said point, means operating during each pause in the motion of the griddle to swing the peel into contact with the griddle and to advance the peel to pick up a cake and carry the same clear of the griddle, an abutment movable into engagement with the griddle to prevent the cake from sliding as it is being picked up by the peel, means for raising the abutment from the path of the cake after the latter has been picked up, a scraper carried by the abutment, means for raising the peel against the scraper, and means for withdrawing the peel in contact with the scraper during advance of the griddle to scrape the cake off the peel.

17. In a cake baking machine, a rotary griddle, means for advancing the griddle step-by-step to bring cakes thereon successively to a delivery point, a peel at said point, means operating during each pause in the motion of the griddle to swing the peel into contact with the griddle and to advance the peel to pick up a cake and carry the same clear of the griddle, an abutment movable into engagement with the griddle to prevent the cake from sliding as it is being picked up by the peel, means for raising the abutment from the path of the cake after the latter has been picked up, a scraper, means for raising the peel against the scraper, means for withdrawing the peel in contact with the scraper to slide the cake off the peel, and a receptacle adapted to receive the cake slid off the peel.

In testimony whereof, I have signed this specification.

HARRY RUSSELL BRAND.